United States Patent Office 3,796,693
Patented Mar. 12, 1974

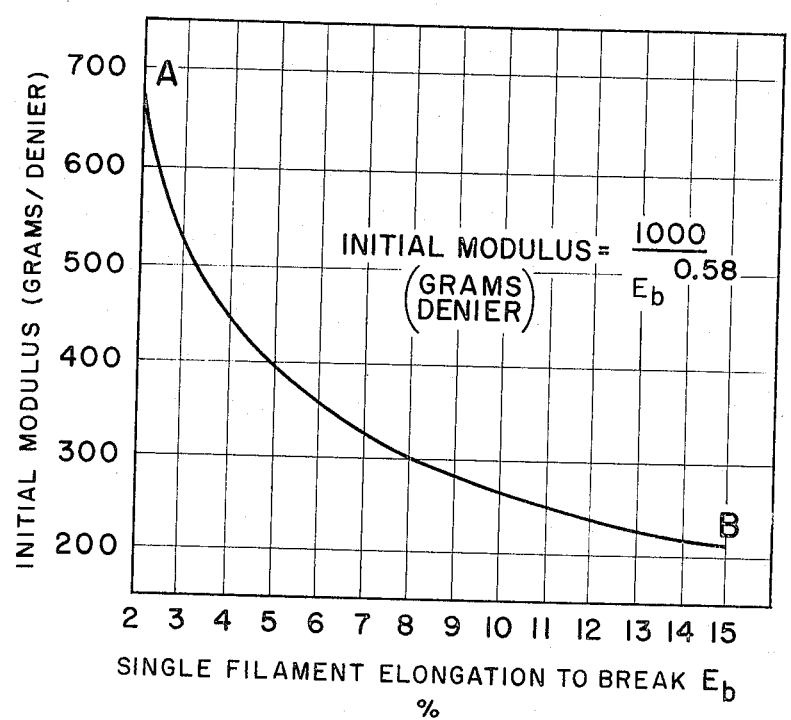

3,796,693
HIGH MODULUS AROMATIC POLY(AMIDE HYDRAZIDE) FIBERS
Herbert S. Morgan, 410 Cooke St., Apex, N.C. 27502; and Jack Preston, 2703 Ashland St. 27608; and William B. Black, 751 Currituck Drive 27609, both of Raleigh, N.C.
Continuation of abandoned application Ser. No. 748,443, July 29, 1968. This application Aug. 23, 1971, Ser. No. 174,215
Int. Cl. C08g *20/00, 20/04*
U.S. Cl. 260—78 A
5 Claims

ABSTRACT OF THE DISCLOSURE

High temperature organic fibers having densities greater than 1.37 and unusually high intial moduli of over 700 g.p.d. at elongations of 2 percent or greater have been prepared through the use of high viscosity wholly aromatic polymers. These fibers are less brittle, less water sensitive and more versatile than high modulus glass fibers in fiber reinforced resinous composite structures.

---

This application is a continuation of our copending application Ser. No. 748,443, filed July 29, 1968, now abandoned.

The recent successes of glass and graphite fiber reinforced composites have brought about widespread changes with respect to basic design and construction capabilities. Many design and construction elements previously limited to metals, concrete and other conventional materials can now be replaced by strong, lightweight glass and graphite fiber reinforced plastic materials which can be tailored to achieve strength per unit weight with versatility of design and ease of fabrication exceeding that found through the use of conventional materials. The desirable properties of glass and graphite fibers which make them useful as reinforcing elements in plastic composite materials are their relatively lightweight and high modulus properties which have very greatly exceeded modulus properties heretofore achieved in fibers made from organic polymer. "E" glass and, even more recently, "S" glass and graphite fibers because of their high modulus properties and resistance to heat have found wide application and use, as reinforcing elements for a wide range of organic resins, notwithstanding certain inherent drawbacks and limitations with respect to their use. A full description of E-glass and S-glass may be found in L. J. Broutman and R. H. Krock, "Modern Composites Materials," Addison-Wesley Publishing Company, Reading, Mass., 1967 at pp. 280–302 and 307–309.

In this respect there appears to obtain a certain degree of incompatibility between graphite and glass fibers and the organic resin matrices in which they are embedded as reinforcing elements. This incompability results in poor bonding between the resin and the fiber and thereby can greatly reduce the efficiency of performance of the composite according to properties which would be forecast under the Rule of Mixtures wherein applicable. This drawback in many cases can be largely reduced through the use of frequently expensive and complex bonding or coupling agents to enhance the bond at the fiber/matrix interface. Glass and graphite fibers are quite brittle and necessitate careful handling not only in their preparation but in their use in the fabrication of shaped composite structures. Aside from preparation and fabrication using glass and graphite fibers, their brittle quality tends to render their impact resistance to less than is desirable for many end uses. Moreover, glass fibers appear to possess an inherent water sensitivity which results in limits to its effective use where its properties must be maintained under conditions which cause fiber wetting.

Until the invention described herein fibers made from organic polymers have not been made having properties of modulus at reasonable elongation values which could approach the properties of "S" glass. For example, polyester tire cord traditionally considered high modulus organic fibers possess tensile properties far below that of "S" glass reinforcing agents.

Through the use of a particular class of organic polymers which possess certain interrelated chemical and physical features and by achieving efficient molecular packing through high stretch orientation in the preparation of fibers from these polymers we have discovered that certain organic fibers can be made having modulus values much greater than "S" glass. Moreover, the use in composite structures of high modulus fibers of these organic polymers appears to result in greater compatibility between fiber and resinous matrices than found in the case of glass fibers. Additionally, the organic fibers of this invention are extremely moisture resistant and maintain their excellent tensile properties at moderately high temperatures.

The organic fibers of this invention have densities above 1.37, single filament elongation-to-break ($E_b$) values ranging from 2 to 15 percent and an initial modulus, in grams per denier, greater than the value.

$$1000E_b^{-0.58}$$

To obtain such properties these fibers must be prepared from essentially linear organic polymers which do not melt at temperatures below 200° C. and possess inherent viscosities greater than 3.5 when measured in a suitable solvent.

The value, $1000E_b^{-0.58}$, wherein the single filament elongation-to-break ($E_b$) lies between 2.0 and 15 percent is represented by the curve AB on the graph in the figure. Thus, the family of fibers of the instant invention must possess initial moduli of greater than about 210 at 15 percent elongation-to-break and an initial modulus of greater than 700 at 2 percent elongation. These extraordinary properties are unique for high temperature, high density organic fibers and provide a versatility of property relationships within the above-indicated limits which have not heretofore been approached by modern science.

The class of polymers capable of being spun into the high modulus fibers of this invention are wholly aromatic linear polymers which provide rigid chains such that the ability of the polymer chain to fold, rotate in random coil or irregular fashion is minimized. That is, it is essential that there must be little irregular molecular spin along the chain so that the oriented molecules in the fiber form are capable of packing to the extent that fiber of 1.37 or greater can be achieved. Efficient or close molecular packing, reflected by the fiber density is essential to the achievement of the greatly superior and unique combination of properties possessed by the fibers of this invention. To insure rigidity along the polymer chain, the recurring divalent aromatic radical along the polymer chain must have centers of symmetry, as in the case of 1,5-naphthylene, 2,6-naphthylene, and 4,4'-biphenylene, or simply be all para oriented, or they may be a combination of para oriented aromatic radicals along with other aromatic radicals having centers of symmetry. Another essential feature of this class of polymers is that the recurring aromatic radicals along the polymer chain must be linked in the chain through carbocyclic carbon atoms to one of

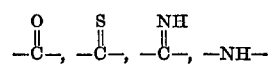

or —N=N— radicals. These interlinking groups and combinations of them, such as

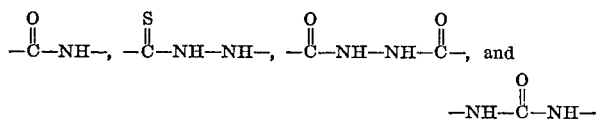

and

—NH—C(=O)—NH— to the exclusion of those radicals which allow the polymer chains to fold, bend or otherwise penetrate the circumference of the theoretical cylinder formed by the orbital molecular rotation of molecules in a rigid chain polymer, are essential to the achievement of superior fiber properties. We have also found that the above-described aromatic radicals may be linked in the polymer chain, without disruption of chain rigidity, by single or multiple ring aromatic heterocyclic radicals whch do not allow the chain to bend or fold as reflected by fibers prepared therefrom having densities greater than 1.37.

The aromatic heterocyclic radicals which may be present in the wholly aromatic polymers are unsubstituted 5 and 6 membered rings containing only the C, O, S and N. In order to maintain the chain rigidity necessary for this invention the heterocyclic radicals must contain at least two extracyclic interlinear covalent bonds which are non-adjacent with respect to the cyclic atoms of the ring. Additionally, at least two extracyclic interlinear covalent bonds must be oriented with respect to one another at maximum spacing. These requirements apply with respect to the single rings in the case of a multi-ring system. Exemplary of such ring systems are the following radicals:

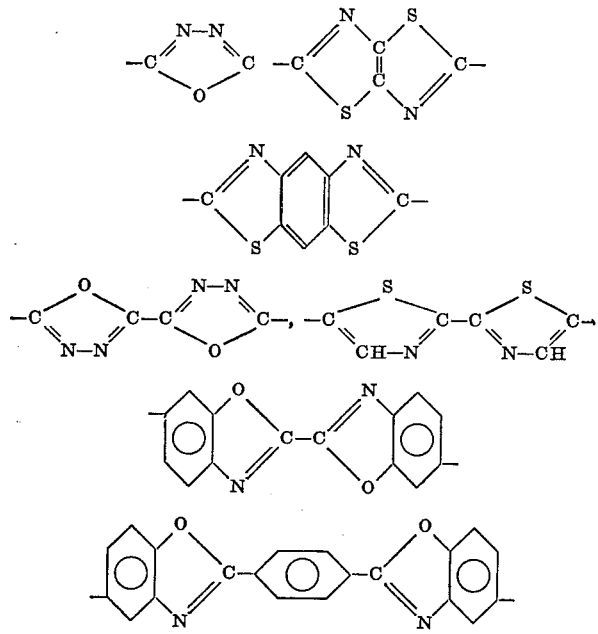

Thus, the key to the orientation of the carbocyclic or heterocyclic radicals which may form links in the polymer chains is that the covalent bond at one end of a given radical must be that which is the greatest distance possible from the other bond or bonds linking the radical in the polymer chains.

In addition to the chemical requirements for the polymers above-mentioned there are two other physical properties of the polymer which must be observed before fibers spun from the polymers can achieve the remarkable properties of the fibers disclosed. The polymer must not melt at temperatures below about 200° C. which provides good fiber properties in many use applications without which other fibers having similar properties would not be useful.

In this respect polymers employed in the fibers of this invention exhibit only slight changes in dynamic mechanical modulus (less than about 20 percent in Vibron determinations run at 11 cycles/second) in the range from 25° C. to 200° C. indicating excellent retention of properties over a wide temperature range. This characteristic differs greatly from that found in many other polymers and permits use of the fibers of the invention as composite reinforcements with a variety of fabrication techniques in which other organic reinforcing fibers would be degraded to the extent that their utility as reinforcing materials would be essentially negated.

Moreover, the polymers used to make the fibers of this invention must have molecular weights high enough to reflect inherent viscosities of at least 3.5. It has been generally observed that polymers of the class mentioned above, even though corresponding to other essential requirements, do not provide fibers having the properties of the fibers of this invention unless the inherent viscosities are greater than 3.5.

Even though the viscosities of the polymers necessarily employed in this invention are ususually high for formation of fibers, the average molecular weights of the rigid-chain polymers necessary to achieve such viscosities are quite low when compared to molecular weights of fiber forming polymers of the well known acrylic, polyolefin and aliphatic polyamide types. Thus, the number average molecular weights of the high viscosity polymers used in this invention may lie in the range of 50,000 to 100,000, for example, whereas fiber forming polyolefins characteristically posses molecular weight of much higher order.

As long as the linearity, the rigidity, the viscosities, the stability to heat up to 200° C. and chemical nature of the polymers are observed in accordance with the limitations described, the method of polymer preparation has not been found to constitute a critical aspect of this invention. Accordingly, the polymers may be prepared by any convenient means. Perhaps the most convenient means comprises solution polymerization of appropriate aromatic dissocyanates or diacid halides with essentially equimolar quantities of difunctional wholly aromatic monomers containing terminal —NH₂ radicals.

These reactions may conveniently be illustrated as follows:

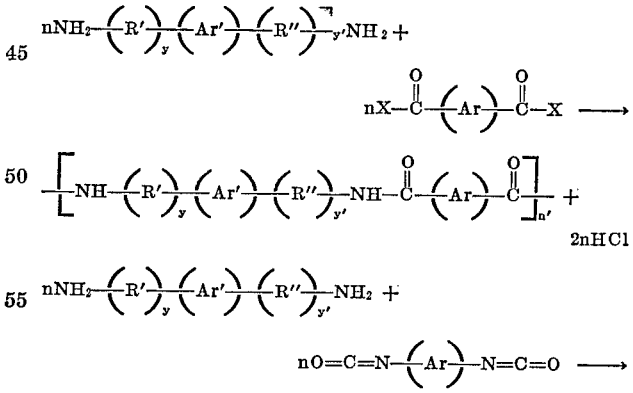

wherein Ar and Ar' may be the same or different wholly aromatic, single or multiple ring, carbocyclic or heterocyclic residues and combination thereof, R' and R" may be the same or different divalent groups,

—C(=O)—, —NH— and combinations thereof, y and y' represent the same or different values 0 and 1, X is a halogen, preferably chlorine, $n$ is a positive number and $n'$ is a number representative of the number of repeat units in the polymer necessary to reflect an inherent viscosity of at least 3.5. Sulfur may be used in the monomers where oxygen is indicated.

A representative polymer system which may be employed to illustrate the polymer, its preparation and spinning to form the novel and superior organic fibers of this invention is an essentially linear wholly aromatic polyamide hydrazide polymer which contain the alternating units characterized by the following formulas,

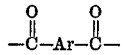  (I)

and

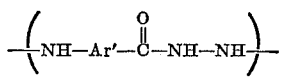  (II)

wherein Ar and Ar' represent the same or different divalent aromatic residues which must be a para oriented single ring, or a multiple or fused ring system containing a center of symmetry with respect to the extracyclic covalent bonding sites, or in the case of aromatic heterocyclic rings the extracyclic bonding must be such that the interlinear spacing is at a maximum distance. Such radicals, in addition to those already mentioned include the following,

wherein R may be radicals such as

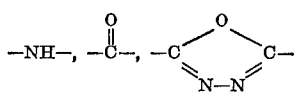

and others hereinabove described, and combinations thereof.

Thus, the wholly aromatic polyamide hydrazide may be represented by repeating segments having the formula,

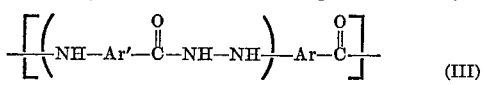  (III)

wherein Ar and Ar' are above defined. The parentheses in Formula III connote the fact that the alternating units, I and II, may occur in head-to-head or head-to-tail fashion to the extent that the arrangement of repeating or alternating units may be such that the polymers range from wholly ordered polymers to polymers having no discernable order as is hereinafter described in greater detail.

In general the wholly aromatic polyamide hydrazides above-described may be prepared through polymerization reactions involving one or two steps. In the case of a two-step reaction, the first step involves the preparation of an amine terminated aromatic dihydrazide, represented by IV. The second step involves reaction of IV

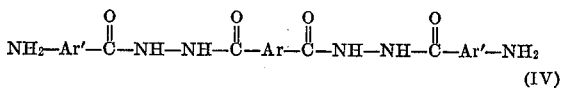  (IV)

with equimolar quantities of aromatic diacid halide. The product of a two-step reaction is an essentially wholly ordered polymer of regularly recurring segments which segments are represented by the following formula,

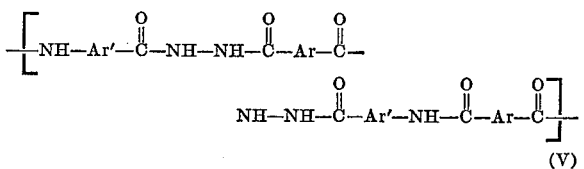  (V)

The term, essentially wholly ordered, as employed herein is intened to connote the orderly arrangement of molecules precisely as set forth in the repeating segment of Formula V and is intended to include those specific compositions which are characterized by such arrangement of molecules, even though an occasional Ar or Ar' group may be derived through the use of a mixture of essentially functionally equivalent monomers.

The one-step preparation of the wholly aromatic polyamide hydrazide may be achieved through the reaction of essentially equimolar quantities of an aromatic diacid halide and an aromatic aminohydrazide as depicted using p-aminobenzhydrazide and terephthaloyl chloride in the following reaction scheme:

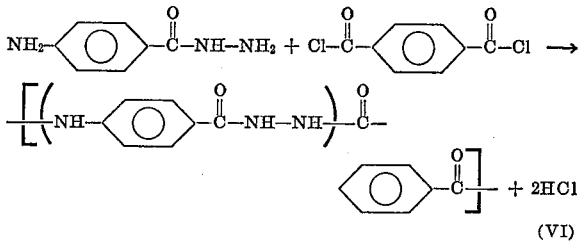  (VI)

Insofar as chemically unsymmetrical monomers such as p-aminobenzhydrazide can enter the polymer in either head-to-head or head-to-tail fashion, as mentioned earlier, no single repeat segment (represented by Formula V) is assured as in the case of the above-described two-stage reaction. Therefore, when referring to the arrangement of units of Formula II the parentheses employed, as in Formulas II and III and reaction VI indicate that such units may occur in reverse order with respect to any other such unit along the polymer chain. Thus, the polymers used to prepare the fibers of this invention may comprise one or more units having the formulas,

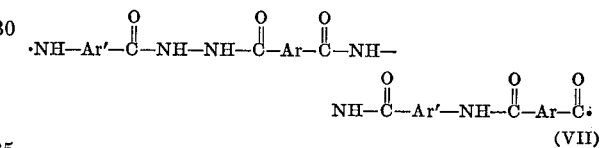

(VII)

and

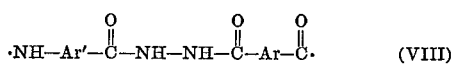  (VIII)

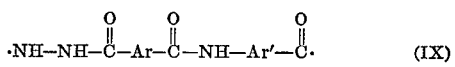  (IX)

used in the sense of being polymer chain segments and not necessarily repeating segments or units so that as either x or y approaches 0 in Formula X,

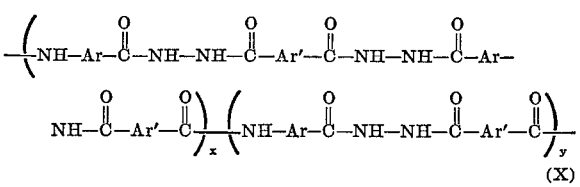

(X)

the polymer becomes a more ordered polymer (x and y are average numbers, including zero, the sum of x and y being representative of the average sequence lengths of segments VII and VIII, respectively). As a general rule, it has been found that those reaction conditions which increase the degree to which the reaction is kinetically controlled will result in an increase in the order of the polymer produced, whereas, those conditions which increase the degree to which the reaction is diffusion controlled will result in decrease in the order of the polymer produced.

The above-described polyamide hydrazide polymers may be prepared through the use of known solution and interfacial techniques. However, since neither the intermediate dihydrazide diamine of Formula IV nor the final polymer of either the one-step or two-step preparation need be isolated prior to polymerization or prior to the formation of fibers according to this invention, the solution polymerization technique is highly preferred.

Solution polymerization generally involves the dissolution of the dihydrazide diamine of Formula IV or the aromatic amino-hydrazide monomers in a suitable solvent which solvent is also a solvent for the aromatic diacid halide and the product polymer. Typical of such solvents are N,N-dimethylacetamide, N-methyl-2-pyrrolidone, hexamethylphosphoramide and mixtures of these and like solvents. In many instances, such solvents are rendered more effective by mixing them with small quantities, generally not more than about ten percent by weight, of a salt of an alkali or alkaline earth metal, such as lithium chloride, calcium chloride, magnesium bromide and the like. Preferred among such solvents for the polymerization is N,N-dimethylacetamide (DMAc), and especially DMAc containing a small amount of dissolved lithium chloride.

To the solution of the dihydrazide diamine or aromatic amino-hydrazide reactant maintained at a temperature between −30° C. and 100° C., preferably between −20° C. and 35° C., the aromatic diacid halide is added as a solid, a liquid or as a solution. The reaction mixture should be stirred during addition of the aromatic diacid halide and until the reaction is substantially complete or until the desired viscosity is obtained. Hydrogen halide by-product should be neutralized upon completion of the polymerization reaction in order to reduce its corrosive effects on extrusion or other handling equipment. This may be accomplished by adding essentially stoichiometric quantities of materials such as lithium hydroxide, lithium carbonate, calcium carbonate, calcium acetate and the like.

Superior fibers of this invention have been prepared employing wet spinning or a dry-jet wet spinning technique, the latter technique being where the solution of polymer is extruded from one or more orifices situated a short distance above the surface of a coagulation bath, into a gaseous atmosphere and then into the coagulation bath principally composed of water and a minor proportion of the solvent or solvents employed in the spinning solution to thereby coagulate the freshly extruded filament in gel form. The gel filament, resulting from either wet spinning or dry-jet wet spinning is thereafter washed to extract salts and solvent, wet-stretched, dried, optionally given a conventional textile antistatic and/or lubricant finish, optionally heat-stretched and packaged. Spinnability of the aromatic polymers is excellent so long as the dopes remain gel-free. Where there is a tendency toward gross gellation or to form gelled particles in the dopes, particularly in dopes of high viscosities, the addition of small amounts of water serves to improve dope ability. Spinnability of the high viscosity dopes required by the invention can be improved by mild heating to reduce viscosity. The polymer dopes are preferably, but not critically, held at temperatures between about 40° C. and 120° C., preferably from 60° C. and 90° C., and at polymer concentrations of from about 4 to 12 percent by weight of solids, both parameters depending primarily on the average molecular weight of the polymer as reflected by its inherent viscosity. Moreover, in dry-jet wet spinning operations the optimum distance of the jet face from the surface of the coagulation bath generally lies within the range of from about one-eighth to about one-half of an inch depending on viscosity, temperature and other conditions.

The versatility of fibers of the class of wholly aromatic polymers described herein can be realized principally through variation of polymer chemical orientation, viscosity and spinning conditions. To achieve maximum tensile properties, polymers having high or complete para orientation should be employed at rather high polymer viscosities and spun under conditions which minimize the spin orientation by minimizing the stretch during the coagulation and in a hot water cascade and thereafter thermally stretching the fiber under generally non-aqueous conditions to impart maximum stretch orientation and crystallinity.

More particularly, where fibers having modulus values exceeding those of the best glass fibers are desired, the polymers described in Formula III should be highly para oriented, thus the divalent residue Ar should be greater than 85 weight percent para oriented and Ar' should be at greater than 85 weight percent para oriented with any different orientation of the Ar' residue being essentially meta orientation. Quasi-para orientation occurs in the case of heterocyclic rings such as,

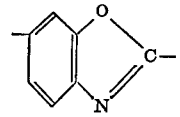

where the orientation represents considerably greater maximum spacing than meta orientation and slightly less than para orientation at maximum possible distance for the particular radical. Therefore, in the consideration of chain rigidity of the polymers employed in the instant invention it will be observed that radicals possessing quasi-para orientation can occur considerably more frequently along the polymer chain than in the case of meta-oriented radicals without sacrifice of chain rigidity.

It has been found that the X-ray diffractions of high modulus fibers of polymers made from terephthaloyl chloride and p-aminobenzhydrazide are "collagen-like" with respect to the numerous orders of reflection in the longitudinal direction, indicating a high degree of regularity over long distances in the polymer chain. This is interpreted to mean that the polymer is not chainfolded but in the extended configuration. Such an interpretation is also consistent with electron diffraction data obtained on these polymers and their almost total lack of any low angle X-ray scattering. The high moduli of the fibers of the instant invention differ from fibers made from polymers which contain tetrahedral carbon atoms, metaphenylenes, cyclohexane and similar ring structures, all of which contain chainfolding or a "zig-zag" array of chain units. Insofar as the fibers of this invention are in the fully extended state or nearly so, stress is to a large extent against the para-phenylene rings which can yield little under stress, thus,

While the polymers useful in making the fibers of this invention have been illustrated in great detail with respect to a given system for purposes of being concise. Other polymers, for further example, represented by the formulas,

and

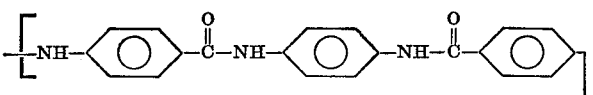

prepared by polycondensation of terephthaloyl halide with appropriate amines, can also be used to make the fibers described herein by spinning processes which result in high stretch orientation to result in fibers having densities greater than 1.37 as earlier indicated.

The present invention is further illustrated by the following examples which are not intended to be limiting in any respect. In the examples, the tenacity, elongation and modulus values were obtained using an Instron Tester (Model No. TM) with a 1″ gauge length and an extension rate of 100 percent per minute. The fiber samples were preconditioned at 65 percent relative humidity at 70° F. for 24 hours prior to testing, and then tested at these conditions. The data presented are generally the result of 5 breaks.

In the following examples, the preparation of all polymers was carried out under nitrogen. The polymer solutions were spun into a water bath at 20° C., containing 0–2 percent dimethylacetamide, unless stated otherwise. Spinning speeds were generally about 100′ per minute. Hot-drawing was carried out over a 12″ hot block with profile temperature.

EXAMPLE I

A clean, dry, 3-liter resin kettle equipped with stirrer, gas inlet tube and drying tube was charged with 56.69 grams (0.375 m.) of para-aminobenzhydrazide (PABH) to which was added 1300 ml. of dry DMAc. PABH was rapidly and completely dissolved. The kettle temperature was adjusted to between −10 and −15° C. whereupon 76.136 grams (0.375 m.) of solid terephthaloyl chloride (TCL) was added with stirring to a powder funnel and the funnel was thereafter rinsed with 26 ml. of DMAc which rinse was added to the kettle. Upon completion of addition of TCL the stirrer speed was increased for about 5 min. and thereafter reduced for about an hour and 20 min. at which time external cooling was discontinued. After continued stirring for one-half hour, a slurry of 65.65 grams (99.5 mole percent of theory) of calcium acetate monohydrate, 13.5 ml. of water and 304 ml. of DMAc was added to the reaction mixture at ambient temperature. After one hour and 10 min. the reaction kettle was warmed to 70° C. for 1 hr. The reaction mixture was then degassed by vacuum and allowed to stand overnight to provide a polymer solution having a Brookfield viscosity at 23° C. of 7,000 poises.

The polymer thus prepared did not melt at temperatures up to 200° C., exhibited a specific viscosity of 0.867, and an inherent viscosity of 6.25 (0.1 g. in 100 ml. of DMSO at 30° C.)

The polymer solution thus prepared was spun into an aqueous coagulation bath from a 7-mil., 15-hole spinnerette situated ⅛ inch above the surface of the bath with calculated jet-stretch of 0.62×, washed without stretching in an aqueous cascade bath, dried at 150° C. on rolls and drawn over a hot shoe at 300° C. to provide a 2.13× hot stretch and thereafter collected on the bobbin. The fiber possessed the following properties:

Denier, 9.64 d.p.f.
Tenacity, 12.10 g.p.d.
Single filament elongation-to-break, 3.3%
Initial modulus, 543 ps.i.
Density, 1.425
Birefringence, 0.356

EXAMPLE II

A polyamide-hydrazide polymer having an inherent viscosity of 4.72 measured as a 0.5 percent solution in DMSO at 30° C. prepared according to the method described in Example I was employed in DMAc solution containing 6 percent by weight of polymer solids and having a Brookfield viscosity of 1,600 poises at 24° C. The polymer solution was spun from a 6-mil., 15-hole spinnerette situated ⅛ inch above the surface of an aqueous coagulation bath into air and then into a coagulation bath. The gel state fiber was continuously removed from the coagulation bath and passed through a series of two aqueous cascade baths wherein they were given a 1.0× and 1.5× stretch, respectively, dried on heated rolls, passed over a shoe heat at 300° C. and thereafter taken up on bobbins. Four spinning runs were made employing portions of the same polymer solution under different drawing conditions as below indicated:

| Run | Jet stretch | Drier temperature, °C. | Stretch over shoe | Tenacity, g.p.d. | Elongation, percent | Initial modulus, g.p.d. | D.p.f. |
|---|---|---|---|---|---|---|---|
| (a) | 0.65× | 100 | 1.23× | 11.2 | 4.5 | 493 | 9.68 |
| (b) | 2.09× | 150 | 1.23× | 12.0 | 3.7 | 541 | 2.86 |
| (c) | 2.09× | 150 | 1.65× | 12.6 | 2.4 | 630 | 2.08 |
| (d) | 2.09× | 150 | None | 7.8 | 13.5 | 284 | 3.47 |

EXAMPLE III

A polyamide hydrazide polymer having an inserent viscosity of 7.3 (0.1 percent in DMSO at 30° C.) prepared according to Example I was employed in DMAc at 6.8 weight percent polymer solids to provide a solution having a Brookfield viscosity of 11,680 poises. The polymer solution was spun into an aqueous coagulation bath as described in the preceding examples and passed through a single aqueous cascade bath, dried on heated rolls at 150° C., stretched over a hot shoe at 350° C. and collected on bobbins. Variations in fiber properties resulting from the stretch combinations are shown below:

| Run | Stretch Jet | Stretch Cascade | Stretch Hot shoe | Tenacity, g.p.d. | Elongation, percent | Initial modulus, g.p.d. | Denier |
|---|---|---|---|---|---|---|---|
| (a) | 1.00× | 1.50× | 1.53× | 16.8 | 3.7 | 760 | 6.06 |
| (b) | 3.32× | 1.15× | 1.32× | 12.5 | 3.3 | 620 | 3.15 |
| (c) | 2.00× | 1.06× | 1.40× | 16.1 | 4.5 | 645 | 3.29 |

EXAMPLE IV

A solution prepared as described in Example I, having a solids content of 6% and a Brookfield viscosity of 6,800 poises prepared from a polymer having an inherent viscosity of 6.7 (0.1 percent in DMSO at 30° C.) was spun from a 6-mil., 15-hole spinnerette, with a calculated 0.65× jet stretch. The fiber was sequentially passed through two cascade baths at 1.00× and 1.15× stretch ratios and dried in two stages at 100° C. and 150° C. with the following process variations.

(a) The filament was hot-drawn 1.96× over a shoe at 300° C.

(b) The filament was air stretched 1.26× in air between the second cascade bath and the drier, and was not hot-drawn.

These fibers had the following properties:

| | Tenacity, g.p.d. | Elongation, percent | Initial modulus, g.p.d. | Denier |
|---|---|---|---|---|
| (a) | 18.4 | 3.7 | 718 | 6.05 |
| (b) | 12.1 | 11.9 | 458 | 8.32 |

EXAMPLE V

To 1300 ml. of dry DMAc in a 2-liter resin kettle were added 56.69 g. (0.375 m.) of p-aminobenzhydrazide. The kettle was immersed in a water bath at 25° C. and a mixture of 15.227 g. (0.075 m.) of of isophthaloyl chloride and 60.901 g. (0.30 m.) of terephthaloyl chloride was added to the kettle with rapid stirring from a beaker which was thereafter rinsed with 50 ml of dry DMAc, also added to the kettle. After about 15 minutes the stirrer speed was reduced and the reaction was allowed to proceed for one hour at 25° C. after which the water bath was removed and 66.07 g. of Ca(AcO)$_2$·H$_2$O, 13.5 ml. of H$_2$O and 285 ml. of DMAc were added to the kettle. The neutralization was allowed to proceed for 2 hours at 25–30° C. and then warmed gently in order to complete the reaction. The solution in the kettle was then degassed with a vacuum. The solution contained 6 weight percent of polymer having an inherent viscosity 0.1 percent in DMSO at 30° C.) of 5.01 and the solution had a Brookfield viscosity of 1,920 poises.

The above polymer solution was spun according to the spinning procedure described in Example III wherein the drier temperature was maintained at 150° C. and the following properties were obtained.

| | Tenacity, g.p.d. | Elongation, percent | Initial modulus, g.p.d. | Work-to-break, g.-cm./den. cm. |
|---|---|---|---|---|
| As-spun | 8.3 | 13.8 | 254 | 0.9 |
| Hot-drawn | 11.5 | 4.5 | 475 | 0.36 |

EXAMPLE VI

A polyamide-hydrazide having an inherent viscosity of 5.7 was prepared by the method described in Example I. The DMAc solution of polymer having a Brookfield viscosity of 3,500 poises was spun through a 6-mil., 15-hold spinnerette at a calculated jet-stretch of 0.65×, a cascade stretch of 1.5×, passed over two drier rolls at 100° C. and 150° C. and then double drawn over a hot shoe. The first hot-drawn was 1.40× at 300° C.; the second was 1.05× at 400° C. The fiber obtained had the following properties: denier, 4.99; tenacity, 19.1 g.p.d.; elongation, 3.1%; initial modulus, 828 g.p.d.

EXAMPLE VII 4.32 g. (0.01 m.) of the diamine,

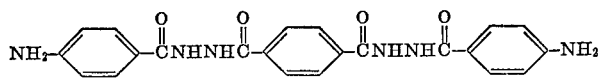

prepared from an excess of p-aminobenzhydrazide and terephthaloyl chloride, was dissolved in 70 ml. of DMAc containing 5 percent dissolved lithium chloride, under nitrogen. The solution was cooled to −10° C. and 2.03 g. (0.01 m.) of terephthaloyl chloride added. After 10 minutes, the clear viscous polymer solution which formed was warmed to room temperature, and an additional 20 ml. of DMAc with 5 percent dissolved LiCl was added. After stirring for 30 minutes at room temperature the dope was neutralized by the addition of 0.67 g. (90 percent of theory) $Li_2CO_3$ and 10 ml. DMAc. The 5 percent polymer dope was stirred at room temperature for 1 hour, at 50° C. for 30 min. and then at 80° C. for 20 min. The dope was then degassed under house vacuum for 10 minutes. The polymer had an inherent viscosity of 5.08 (0.5 percent in DMSO at 30° C.).

The polymer solution having a Brookfield viscosity of 24,000 poises was spun through a 5-mil., 10-hole jet, at a jet-stretch of 2.34, a cascade stretch of 1.14 and a drier temperature of 150° C. One sample of fiber (a) was hot-drawn 1.25× at 300° C., while a second sample (b) was not hot-drawn. Unaveraged single filament properties of these fiber samples are given in the following table.

| Sample | Denier | Tenacity, g.p.d. | Elongation, percent | Initial Modulus, g.p.d. | Density | Birefringence |
|---|---|---|---|---|---|---|
| (a) | 2.69 | 10.9 | 2.7 | 590 | 1.47 | 0.455 |
| (b) | 3.48 | 8.50 | 12.0 | 323 | 1.44 | 0.421 |

EXAMPLE VIII

A one-liter resin kettle was charged with 5.38 g. (0.0356 m.) of p-aminobenzyhydrazide and 125 ml. of DMAc containing 5 percent dissolved LiCl. The solution was cooled to −10° C., and a solution of 7.23 g. (0.0356 m.) of terephthaloyl chloride in 160 ml. of tetrahydrofuran was added dropwise over a 45 min. period with rapid stirring. The reaction was stirred for 10 minutes after completion of the addition of diacid chloride solution. The cooling bath was removed and the reaction mixture placed under house vacuum for 90 minutes in order to remove the tetrahydrofuran. 40 ml. of DMAc with 5 percent dissolved LiCl and 20 ml. of DMAc were added to thin the very viscous solution which was allowed to stir overnight. 2.5 g. (95 percent of theory) $Li_2CO_3$ in 15 ml. of DMAc were added, and after stirring at ambient temperature for 1 hour, the mixture was warmed to 50° C. for 1 hr. and an additional 20 ml. of DMAc with 5 percent dissolved LiCl were added. The mixture was then warmed to 70° C. for 2 hours and 80° C. for 30 min. and additional 0.1 g. $Li_2CO_3$ added to complete the neutralization.

After degassing, the polymer having an inherent viscosity of 4.76 (0.5 g. in 100 ml. DMSO at 30° C.) was spun from solution to give a highly oriented fiber having the following properties without hot-drawing.

Tenacity, 8–2 (g.p.d.); elongation, 9.4%; initial modulus, 291 g.p.d.

EXAMPLE IX

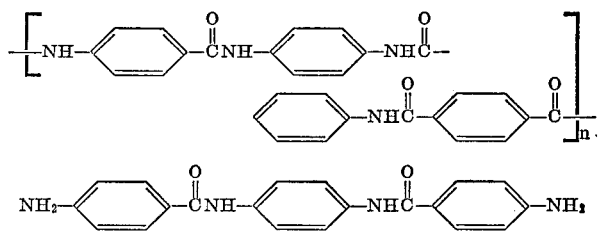

A pear-shaped, 3-necked flask, equipped with stirrer, gas inlet tube and drying tube was flushed with nitrogen and flamed dried. 0.346 g. (0.001 m.) of the above diamine and 3 ml. of hexamethylphosphoramide (HPT) were charged to the flask. 3 ml. of DMAc containing 5 percent dissolve LiCl was then added and the solution cooled to 0° C., using an ice-water bath. 0.203 g. (0.001 m.) of solid terephthaloyl chloride was then added to the stirred solution. After 5 minutes, the bath was removed and the reaction mixture warmed to room temperature. An additional 8 ml. of DMAc with 5 percent dissolved LiCl was added to the mixture, in order to redissolve the polymer which had precipitated during the polymerization.

EXAMPLE X 20 g. (0.088 m.) of 4,4′-diaminobenzanilide and 2.7 g. (.012 m.) of 3,4′-diaminobenzanilide, 5.83 ml. of HPT and 17 ml. of DMAc were charged to a 1-liter dope kettle. The kettle was cooled in an ice-water bath and 20.3 g. (0.10 m.) of solid, freshly distilled terephthaloyl chloride added to the reaction mixture using 78 ml. of HPT to wash the solid into the flask. After 1 hour, the polymer solution became very viscous and 8.4 g. of $LiOH \cdot H_2O$ was added to neutralize the dope. The dope had a Brookfield viscosity of 16,000 poises at 23° C. The inherent viscosity of the polymer was 4.4 (0.5 percent in concentrated $H_2SO_4$ at 30° C.).

EXAMPLE XI

To a 2-liter kettle equipped with stirred and gas inlet tube were added 47.67 (0.21 m.) of 4,4′-diaminobenzanilide, 1200 ml. of HPT and 35 ml. of DMAc in solution. The solution was heated to 45° C., to hasten solution of the diamine, and then cooled in an ice-water bath. 42.68 g. (0.21 m.) of freshly distilled terephthaloyl chloride was added with 190 ml. of HPT as wash solvent. The viscosity increased rapidly shortly thereafter. The reaction mixture was stirred for 1½ hours and then 17.68 g. of $LiOH \cdot H_2O$ was added along with 50 ml. of HPT.

Brookfiield viscosity, 11,200 poises at 65° C. The inherent viscosity of the polymer was 4.7. Other samples of polymer was prepared in a similar manner having inherent viscosities of 8.3 and 8.8 measured as 0.5 percent solution in concentrated $H_2SO_4$.

The polymers of Examples IX–XI can be spun to fibers having density values above 1.37 and high moduli well above the value $1000E_a^{-0.58}$. Moreover, none of the polymers above prepared melted at temperatures below about 200° C.

EXAMPLE XII

The hot-stretched fiber of Example VII was heated at 250–285° C. for 2 hrs. and at 300° C. for 1 hr. 45 min. in nitrogen to convert it to the corresponding polyoxadiazole-amide fiber represented by the following reaction scheme:

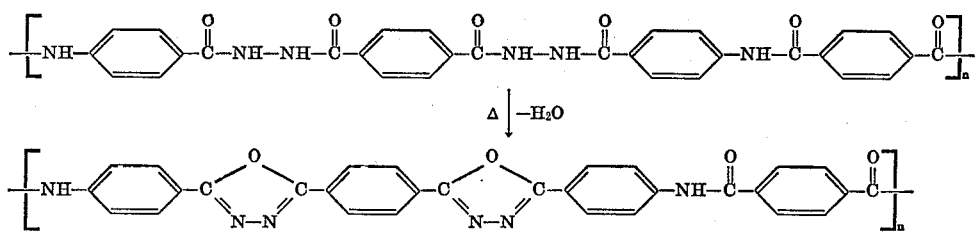

The tensile properties of the heat-treated fiber were:

| | Denier | Tenacity, g.p.d. | Elongation, percent | Initial modulus, g.p.d. | Work-to-break, gm. cm./den. cm. |
|---|---|---|---|---|---|
| Average | 2.61 | 12.3 | 3.0 | 561 | 0.275 |
| Single filament, highest tenacity | 2.58 | 15.3 | 3.6 | 564 | 0.419 |

Inherent viscosity

It has been found that for a given polymer system, the modulus-elongation curve is generally raised as a function of inherent viscosity. Further, the determination of our point on the curve for a given system, allows one to predict reasonably accurately, the modulus value at any other elongation. Inherent viscosities as described herein can be determined in any suitable polymer solvent such as N-methylpyrrolidone, dimethylacetamide, dimethylacetamide with lithium chloride, concentrated sulfuric acid, dimethylsulfoxide, hexamethylphosphoramide and the like generally as 0.5 percent solution of polymer at about 30° C. Similarly, viscosities can be determined at other concentrations where convenient, for example, 0.1 percent solutions can be employed.

Fiber densities as herein described are readily obtained by placing a fiber sample in a liquid having a density lower than that of the fiber sample and raising the density of the liquid by addition of another liquid having a density greater than that of the fiber sample until a liquid/fiber density equilibrium is achieved after which the density of the equilibrium density liquid can be accurately measured on a Fisher-Davidson Gravitometer. The term "density" used herein is intended to be synonymous with specific gravity and density in the examples is measured in grams per cubic centimeters.

Birefringence values reported herein were obtained using an Ehringhaus High Order Compensator.

As previously mentioned and illustrated in the foregoing examples, the modulus/elongation relationship of the fibers of this invention is quite varied, ranging from extraordinarily high moduli values at elongations up to about 4 percent to high moduli, glass-like fibers at moderate elongations greater than about 4 percent. Generally, with a given rigid chain polymer, the maximum attainable moduli values are most readily obtained through the use of a polymer having an inherent viscosity of greater than about 4. In order to obtain fibers of this type high viscosity polymers should be spun in such a manner as to minimize the orientation engendered by extrusion and coagulation and maximize the stretching orientation through a balance of cascade and hot stretch. Spin orientation is affected by the chemical nature of the polymer, its inherent viscosity, the polymer solids content of the dope, the orifice size, pumping rates, jet stretch and bath concentration and temperature. Generally, spin orientation for a given polymer solution increases with decreasing orifice size and increasing rate of extrusion and increasing inherent viscosity and can be controlled through the judicious use of such variables. Although the hot stretch is not critical to all polymer systems it is generally highly desirable to achieve the best high moduli properties. These high modulus fibers have moduli greater than about 500 grams per denier at elongations less than 4 percent and are ideally suited to replace or be used in combination with inorganic reinforcing agents in composite structures requiring extremely high longitudinal tensile properties. Other composite structures require reinforcing elements having high impact strengths and are generally not available through the use of glass fibers. Here, the fibers of this invention having elongation values of from about 4 to 15 percent coupled with moduli ranging upward from about 210 fill a technological gap and allow for the provision of lightweight, high modulus, high impact resistant structures.

The fibers of this invention can be used as composite reinforcing elements in a wide range structural design where engineering and esthetics demand high modulus per unit weight and high moisture resistance, e.g. in structures such as aircraft wing coverings, various struts, beams and pull rods, automobile bodies, boat hulls, skis, fishing rods, body armor, helmets, contour furniture and the like. The fiber reinforcements can be used in the form of continuous filament tow, chopped filament, woven and non-woven fabrics.

What is claimed is:

1. A synthetic fiber of an essentially linear wholly aromatic poly(amide-hydrazide), wherein said fiber has a single filament elongation-to-break ($Eb_b$) ranging from 2.0 to 15 percent, an initial modulus in grams per denier greater than the value $1000\ E_b^{-0.58}$, and a density greater than 1.37, wherein said poly(amide-hydrazide) has an inherent viscosity of at least 3.5 as determined at 0.5 percent concentration in a solution of dimethylsulfoxide at 30° C. and is the condensation product of substantially equimolar amounts of aromatic diacid halide and aromatic aminohydrazide and contains divalent aromatic radicals of which at least about 85 weight percent are para-oriented, having a plane of symmetry or linked by ring atoms having a maximum spacing.

2. The fiber of claim 1 wherein the poly(amide hydrazide) consists essentially of recurring units having the structural formula

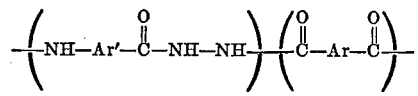

wherein the parentheses connote that the moieties therein may be head-to-head or head-to-tail and Ar and A' represent aromatic carbocyclic residues, aromatic heterocyclic residues or combinations thereof, any extracyclic bonding within said aromatic residues being through a radical selected from the group consisting of

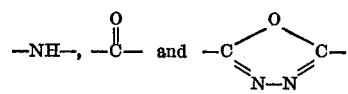

said aromatic heterocyclic residues containing 5 or 6 ring atoms selected from the group consisting of carbon, oxygen, sulfur and nitrogen.

3. The fiber of claim 2 wherein Ar and Ar' are phenylene radicals.

4. The fiber of claim 1 wherein subtsantially 100% of the aromatic radicals are para-oriented.

5. The fiber of claim 1 wherein the poly(amide hydrazide) consists essentially of recurring units having the structural formula

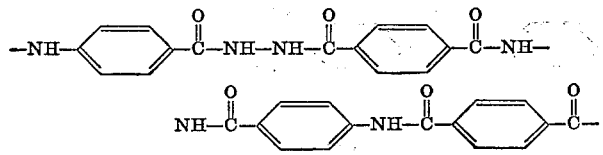

References Cited

UNITED STATES PATENTS

| | | | |
|---|---|---|---|
| 3,130,183 | 4/1964 | Frazer | 260—78 |
| 3,476,719 | 11/1969 | Frazer et al. | 260—78 |
| 3,094,511 | 6/1963 | Hill et al. | 260—78 |
| 3,287,324 | 11/1966 | Sweeny | 260—78 |
| 3,324,086 | 6/1967 | Preston | 260—78 |
| 3,354,120 | 11/1967 | Bach et al. | 260—78 |
| 3,376,268 | 4/1968 | Preston | 260—78 |
| 3,376,269 | 4/1968 | Preston | 260—78 |
| 3,232,910 | 2/1966 | Preston | 260—78 |
| 3,240,760 | 3/1966 | Preston et al. | 260—78 |
| 3,260,700 | 7/1966 | Rudner et al. | 260—78 |
| 3,354,125 | 11/1967 | Smith et al. | 260—78 |
| 3,130,182 | 4/1964 | Frazer | 260—78 |
| 3,414,645 | 12/1968 | Morgan | 264—210 F |
| 3,632,548 | 1/1972 | Preston | 260—78 TF |
| 3,642,707 | 2/1972 | Frazer | 260—78 TF |
| 3,642,711 | 2/1972 | Culbertson | 260—78 TF |

FOREIGN PATENTS 180,796   3/1966   U.S.S.R.

FOREIGN PATENTS

Culbertson et al.: Journal of Polymer Science, Part B, vol. 5 (1967), pp. 807–812.

HAROLD D. ANDERSON, Primary Examiner

U.S. Cl. X.R.

152—330; 260—30.2, 30.6, 30.80 M, 32.6 N, 65, 78 R, 78 S, 78.4 R; 264—176 F